United States Patent [19]
Coan et al.

[11] Patent Number: 6,091,453
[45] Date of Patent: Jul. 18, 2000

[54] HAND HELD REMOTE CAMERA

[76] Inventors: Steven Coan, 225 Birmingham Ct., Roselle, Ill. 60172; Gerald T. Mroch, 8950 Archer Rd., Willow Springs, Ill. 60480

[21] Appl. No.: 08/688,102

[22] Filed: Jul. 29, 1996

[51] Int. Cl.⁷ .......................... H04N 5/222; H04N 5/225
[52] U.S. Cl. ........................ 348/373; 348/370; 348/372; 348/82; 396/422; 248/187.1
[58] Field of Search ..................... 235/435, 472, 235/473; 348/65, 68, 75, 76, 370, 371, 372, 373–376, 61, 82, 84, 85; 396/17, 268, 269, 274, 419, 420, 422–424, 427, 428; 600/109, 110, 112, 114, 136, 137, 139, 142, 160, 178; 248/160, 187.1; H04N 5/222, 5/225

[56] References Cited

U.S. PATENT DOCUMENTS

| | | | |
|---|---|---|---|
| 4,530,580 | 7/1985 | Ueda et al. | 396/425 |
| 4,643,170 | 2/1987 | Miyazaki et al. | 128/6 |
| 4,759,346 | 7/1988 | Nakajima | 128/6 |
| 4,919,114 | 4/1990 | Miyazaki | 129/6 |
| 4,989,586 | 2/1991 | Furukama | 128/6 |
| 4,993,405 | 2/1991 | Takamura et al. | 128/6 |
| 5,065,249 | 11/1991 | Horn et al. | 348/376 |
| 5,121,147 | 6/1992 | Wada et al. | 396/198 |
| 5,124,797 | 6/1992 | Williams et al. | 358/225 |
| 5,220,198 | 6/1993 | Tsuji | 257/731 |
| 5,305,356 | 4/1994 | Brooks et al. | 376/249 |
| 5,373,317 | 12/1994 | Salvati et al. | 348/65 |
| 5,585,849 | 12/1996 | Robalino | 348/376 |
| 5,864,365 | 1/1999 | Sramek et al. | 348/373 |

*Primary Examiner*—Wendy Garber
*Assistant Examiner*—Ngoc-Yen Vu
*Attorney, Agent, or Firm*—McAndrews, Held & Malloy, Ltd.

[57] ABSTRACT

The present invention is a simple, rugged, preferably hand-held video camera and light source useful for inspection of a remote or obstructed field of view. The invention is particularly adapted for use by automobile mechanics and others, as a replacement for the mechanics' mirrors presently in use. The apparatus comprises a shaft, a support, a pivot, a miniature video camera, and a light source. The shaft has a handle at one end and supports the camera and light source on a support pivoted to its other end. The shaft can be bent to a particular shape readily, then substantially hold that shape as it is used. The light source can be at least one electric-powered illuminating lamp. The preferred light source includes two or more illuminating lamps distributed around the camera lens to reduce shadows. A preferred light source is a series of infrared LED's. The present apparatus has several advantages, particularly inexpensive, versatile construction and a superior, shadow-free light source.

4 Claims, 2 Drawing Sheets

HAND HELD REMOTE CAMERA

The present invention is a miniature video camera and light source which sends a video signal to a remote video monitor through an electric cable. This device is adapted to allow an automobile mechanic to inspect obstructed or remote parts of a running automobile engine. It can also be used for other purposes, such as inspecting other types of machinery.

Mechanics who repair automobile engines and other machinery occasionally need to inspect inconveniently-located parts of a machine, or to watch a remote part of the automobile or a gauge while adjusting or watching another part.

Mechanics have addressed this problem in the past by using a "mechanic's mirror," which commonly is a telescoping metal rod with a handle at one end and a mirror mounted to the far end of the rod by pivots consisting of two separate ball joints joined by a link. The mirror is pivoted manually, then placed to allow the remote part to be viewed by reflecting it in the mirror. The mechanic's mirror has several disadvantages.

For example, a mechanic's mirror requires a short, unobstructed viewing path from the remote part to the mirror, and from the mirror to the eye of the mechanic. Such a clear viewing path may not exist, or may be difficult to find. If the part to be viewed is distant or small, the reflection in the mirror appears even more distant, making it difficult to see what is happening.

For another example, a mechanic showing a customer the problem with his automobile engine cannot readily line up the mirror so his customer can see what the mechanic sees. The mechanic and customer are viewing the mirror from different positions, so they see different parts of the engine in the mirror.

For yet another example, if the part to be viewed is not already illuminated by the room light or sunlight, a separate light must be placed to illuminate it. It may be difficult to place such a light if the part to be illuminated is nearly inaccessible. It may also be difficult to tell, when placing the light, whether the part to be inspected is actually illuminated by the light. The mirror may also block the light when it is in the proper position for viewing.

Another illumination problem is shadows which make it difficult to view the remote area. Two or more light sources may be required to solve this problem, and in some cases there may not be two paths light can follow from different places nearby to the remote area of interest.

Even when these lighting problems can be overcome, if one holds the mirror in one hand and a light in the other, no hands remain to make an adjustment while illuminating and viewing the remote area. As a result, another mechanic or a helper must be found to help with the remote inspection and adjustment procedure.

The use of a mirror is also complicated by the reversal of the image reflected in a mirror. For example, when viewing a sight glass through a mirror from above, the sight glass may appear to be inverted, which makes it hard to tell what is happening. Also, a mirror cannot usually be used to see an object which already faces the viewer and cannot be viewed from the side, as when attempting to examine the bottom of a long, narrow passage or crevice.

In other fields, endoscopes have been used for inspecting internal portions of a living human or animal body through a small incision, and borescopes have been used for inspecting internal assembled parts of a machine. See, for example, U.S. Pat. No. 4,759,346, issued to Nakajima on Jul. 26, 1988. This patent, in FIG. 19, shows an endoscope including a charge-coupled device (CCD) 11 near the insertion end of the endoscope 143 which transmits an electrical video signal through a signal cable 144b to a remote signal processor 21 and a monitor 6 where video images of objects in the field of view of the insertion end are displayed. FIG. 19 shows a remote light source 105 and lens 107 which feed light via a flexible fiber optics light guide 29 to illuminate the field of view, which lies in front of the insertion end of the endoscope. At column 11, lines 30–36, the reference states: "Further, without providing the light source device, such illuminating light generating means as an LED or lamp may be provided at the tip of the insertion part. That is to say, an illuminating means may be at the tip of the insertion part." See also U.S. Pat. No. 4,919,114, issued to Miyazaki on Apr. 24, 1990, FIG. 14, which shows incandescent lamps 293 and a CCD 295 mounted near the distal end of the insertion portion of an endoscope.

The CCD imaging device and related apparatus in the insertion part of an endoscope or similar device is understood to be sensitive to temperatures exceeding 53 degrees C. (about 127 degrees Fahrenheit). See U.S. Pat. No. 4,993,405, issued to Takamura et al. on Feb. 19, 1991, col. 1, lines 40–61 and col 2, lines 20–40; and U.S. Pat. No. 5,220,198, issued to Tsuji on Jun. 15, 1993, col. 3, lines 14–20, which respectively comment on the need to avoid excessive heat generated during operation of the device and to avoid excessive heat while soldering.

Endoscopes are further distinguished because they commonly cannot be bent to an appropriate shape before they are inserted to their viewing positions. Consequently, endoscope designers have been forced to rely on complicated remote steering mechanisms to flex the insertion part at the distal end after it is in, or near, its use position within a patient. Diagnostic imaging equipment (such as fluoroscopy, CAT, or NMR) may be required to determine exactly what the endoscope is looking at.

The insertion end of an endoscope commonly is designed to have a small profile (i.e. a small, usually round cross-section) to fit through a small opening or down a narrow passage, such as an esophagus of a living person, and to do many things, such as illuminating, passing a video image, steering the tip, allowing for sample collection and retrieval, etc. Therefore, the endoscope cannot have an enlarged head. To keep the profile uniform and small, parallel systems for passing illuminating light, electrical power, a video image, sample collection equipment, etc. must be forced into that small cross-section. The cross-section of an endoscope is therefore very crowded, and the need to provide a small cross-section dominates the design of an endoscope. For example, expensive fiber optic technology is extensively used to save space in the insertion end, at the expense of requiring more external equipment to provide the desired light source and video imaging.

In other words, an endoscope is sophisticated, expensive, and delicate equipment which costs a lot of money, must crowd many functions into a small profile, and requires sophisticated training and a professional staff to operate. Mechanics' tools must be relatively simple, rugged, and impervious to the heat, moving parts, solvents, and vibration encountered next to a running engine. Endoscope designers face far different problems, leading to far different solutions, than manufacturers of equipment for automobile engine diagnosis and repair.

SUMMARY OF THE INVENTION

Accordingly, one object of the present invention is to provide a remote viewing apparatus which is not particularly expensive (preferably costing, at most, a few hundred dollars).

Another object of the invention is to provide a remote viewing apparatus which avoids some or all of the disadvantages of a mechanic's mirror.

Still another object of the invention is to provide a remote viewing apparatus which can be operated with one hand, so the other hand is free to perform an adjustment, hold an interfering part out of the way, work in the field of view observed through the apparatus, or the like.

Yet another object of the invention is to provide a remote viewing apparatus which can be operated for an extended period in a hot, dirty, solvent-laden, crowded environment of moving parts, like under the hood of an automobile near a running automobile engine.

Yet another object of the invention is to provide a remote viewing apparatus which can be bent and straightened or otherwise adjusted repeatedly, to allow it to be inserted in a tortuous path to a particular remote area which is not otherwise readily accessible, then returned to its original configuration for other use.

Even another object of the invention is to provide a light source for a remote viewing apparatus which thoroughly illuminates the area to be viewed and minimizes shadows.

Still another object of the invention is to integrate a light source, video camera, and video monitor apparatus so it runs from a single power supply, preferably (but not necessarily) a battery power supply.

Another object of the invention is a remote viewing apparatus which has a minimum of wiring and other connections between a remote sending apparatus, a display apparatus, and an associated power supply.

Still another object of the invention is a remote viewing device in which the sending part can readily be disconnected from the receiving and viewing part, so either can be replaced or repaired individually.

One or more of these or other objects may be satisfied, at least in part, by the present apparatus.

Accordingly, the present invention is a simple, rugged apparatus useful for inspection of a remote or obstructed field of view. The apparatus comprises a shaft, a support, a pivot, a miniature video camera, and a light source.

The shaft is preferably adapted to be held and operated in one hand, though it can also be supported in other ways. The shaft has one end defining a support (for example, a handle) and an opposite end. The support end may be at or near the extreme end of the shaft.

The shaft is normally rigid, which means that it does not readily bend or droop appreciably from a desired shape. "Normally rigid" also includes a shaft which can be bent to a particular shape readily, then substantially hold that shape as it is used. A "normally rigid" shaft can also or instead be a shaft which is resilient, so it can be forced to a suitable position for use against its straightening bias, then sprung back to its original shape when removed.

The support can be the housing of the video camera or a separate structure which is attached to the housing. The support is joined to the opposite or non-handle end of the shaft by a pivot which can be operated to shift the relative positions of the shaft and the support. The pivot therefore allows a sharp bend between the shaft and the support to be formed or straightened, as appropriate.

The miniature video camera is mounted on the support. The video camera has a window (typically an objective lens) for admitting an image of anything within the field of view of the video camera.

The light source can be at least one electric-powered illuminating lamp. The preferred light source includes two or more illuminating lamps distributed around the window to reduce shadows. The light source can be supported on the support. The light source illuminates at least part of the field of view, so an image of objects in the field of view can be generated in the video camera. A preferred light source is one or more infrared LED's.

Other objects and features of the present invention are described in the remainder of this specification and in the claims. The present apparatus has several advantages, particularly rugged, inexpensive, versatile construction and a superior, light-free light source.

DETAILED DESCRIPTION OF THE INVENTION

The following detailed description of a preferred embodiment of the invention is meant to provide construction details and features which are presently regarded as being desirable, and to enable a person skilled in the art to practice and understand the invention and see the preferred modes of construction and operation. This detailed description is merely an illustration of the invention, and does not limit the full scope of any invention as defined in one of the numbered claims following this specification.

Figure 1:
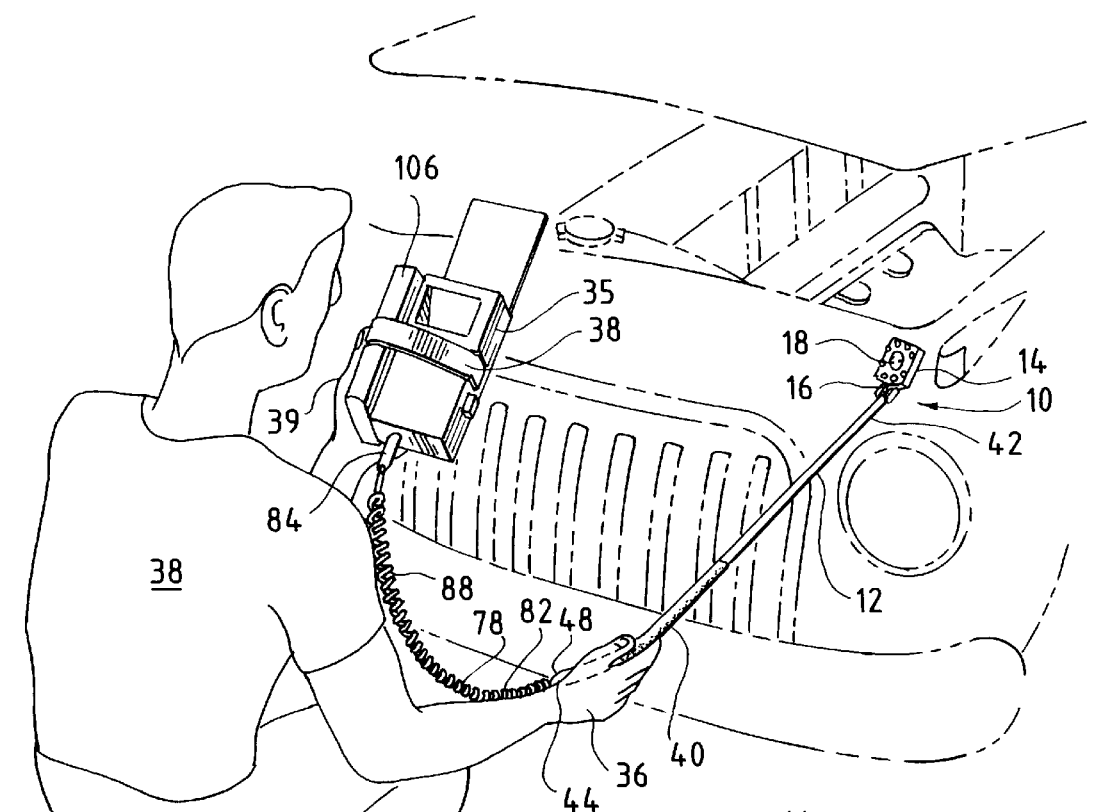
FIG. 1 is a diagrammatic perspective view of the present apparatus, being used to view a remote part under the hood of an automobile by holding the shaft of the apparatus beneath the engine and body of the automobile. The automobile is shown in phantom.
Figure 2:
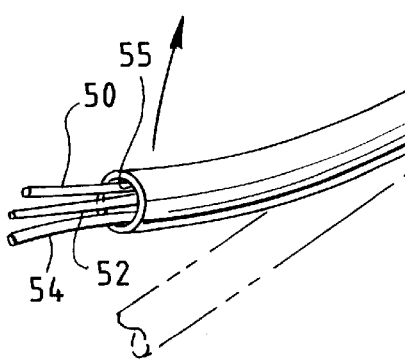
FIG. 2 is an enlarged perspective view showing the far end of the shaft of FIG. 1, the video camera, the lights, the pivots securing the support to the shaft, and the pivoting and bending capabilities of the support and the shaft. Illustrative alternative positions to which the head can be pivoted or the shaft can be bent are shown in phantom lines.

Referring first to FIGS. 1 and 2, the present apparatus for inspection of a remote or obstructed field of view is generally indicated as 10. The apparatus 10 includes a shaft 12, a support 14, a pivot generally indicated at 16, a miniature video camera 18, and a light source represented by the LED (light emitting diode) 20. In this instance, the light source also includes the LED's 22, 24, 26, 28, 30, 32, and 34. The image transmitted from the video camera 18 is displayed on the video monitor 35.

The shaft 12 can be any convenient length, weight, diameter, and flexibility. The shaft 12 preferably is short enough, light enough, and otherwise adapted to be held and operated in one hand, such as the right hand 36 of the mechanic 38 shown in FIG. 1. The monitor 35 is small enough to be supported for at least several minutes in the left hand 39 of the mechanic 38. Alternatively, the monitor 39 can be set on a bench, the fender of the automobile being repaired, on the ground, or in another convenient location.

The shaft 12 has one end 40 defining a support (here, a handle) and an opposite end 42. The handle end 40 may be at or near the extreme end 44 of the shaft 12 or elsewhere on the shaft, without departing from the present invention. If desired, the handle end can extend nearly the entire length of the shaft 12.

The shaft 12 could also be provided with a suitable mounting, such as a base and an adjustable swing-arm support like the articulated parallelogram linkage which is sometimes used to support a drafting light. Such an arrangement might be particularly suitable for a longer or heavier shaft 12. But for flexibility, ease of movement, and low cost, a hand held shaft is preferred.

The preferred shaft 12 is a hollow tube. The shaft 12 is preferably "normally rigid," as that term has been defined already. A "normally rigid" shaft as specially defined in this application can be a flexible shaft, which can be bent to a particular shape readily, then substantially hold that shape as it is used. This bending capability is diagrammatically illustrated in FIG. 2. Alternatively, the "normally rigid" shaft could be completely rigid and unyielding within the scope of the present invention, although that construction would be less preferred in many applications.

Exemplary tubing for the shaft 12 can be a gooseneck tube, but the preferred tubing is flexible brake line tubing or similar tubing which can be bent repeatedly into different shapes, hold any of those shapes as long as desired, then be returned to its original shape or yet another irregular shape.

Alternatively, custom tubes 12 can be permanently bent to various shapes which are commonly useful, then plugged into the video monitor described below. In many instances, this alternative is less preferred, as it requires that additional shafts, camera units, etc. must be acquired. However, a few custom tubes 12 can be made for unusual situations and straight or temporarily bent tubes 12 can be used most of the time.

The shaft 12 can also (or instead) be resilient, so it can be forced to a suitable position for use against its straightening bias, then sprung back to its original shape when removed. The shaft could also be non-shape holding or "droopy" for special situations involving tortuous twists and turns. The tube 12 could still further be made of relatively rigid material which has additional pivotable or articulatable joints. The tube 12 could be made of plastic material that normally holds its shape, but can be heated to make it more flexible, then more easily bent into shape. The tube 12 could also have variations and combinations of these different features, without departing from the broadest scope of the present invention.

The shaft 12 can be perforated through its side wall to define a first port 46 at or near its opposite end 42. The first port could instead be defined by an open extreme opposite end 42 of the tube in a different arrangement not shown here, without departing from the present invention. The tube defining the shaft 12 is open at or near its extreme end 44 to define a second port 48.

The purpose of the ports 46 and 48 is to facilitate running the three electrical circuit wires 50, 52, and 54 within the hollow portion 55 of the tube defining the shaft 12. This internal routing shields the wires from heat, abrasion, and moving parts. The tube defining the shaft 12 could instead be an open channel and the hollow portion 55 could instead be the recess defined by the channel, though the present tubular construction is preferred to provide better protection of the wires 50, 52, and 54. Channel construction would have the advantage of making the wires 50–54 easier to replace.

The support 14 can be the housing of the video camera 18 or a separate structure which is attached to the housing. In this instance, the support 14 is a jacket of flexible material for armoring the external portions of the video camera 18. A full jacket 14 or a partial jacket (not illustrated) can be used.

The jacket 14 is a layer of heat-insulating material for shielding the video camera 18 from heat in its operating environment. The jacket 14 is also resilient, absorbing any shock to the video camera 18, as when it is bumped against an engine part while being used. In the illustrated embodiment, the heat insulating material is a hot-melt adhesive polymer which has been built up around the video camera 18. This material is resilient or rubbery to cushion against shocks.

The support 14 is joined to the opposite or non-handle end 42 of the shaft 12 by a pivot generally indicated at 16. The pivot 16 can be operated to shift the relative positions of the shaft 12 and the support 14. The pivot 16 therefore allows a sharp bend between the shaft 12 and the support 14 to be formed or straightened repeatedly, as appropriate.

Referring in particular to FIG. 2, the pivot 16 can be a series of two balls 56 and 58 movably mounted in and joined by a link 60 to define first and second ball joints. The ball 56 is rigidly secured to the support 14, and forms a first pivotable connection between the link 60 and the support 14. The ball 58 is integral with a neck 62 which is pressed into the open end of the shaft 12. The ball 58 forms a second pivotable connection between the link 60 and the shaft 12.

The video camera 18 is a miniature camera which is commercially available. The miniature video camera 18 is mounted on (and here, embedded in) the support 14. As FIG. 2 illustrates, the video camera 18 is much smaller than the support 14. The support 14 is about 1¼ inches long on the sides 66 and 68 and about ¾ inch long on the side 70, all on the outside of the jacket defining the outer dimensions of the support 14.

The video camera 18 has an objective lens 64, which could also be a transparent panel, an opening, or another structure or adaptation (the lens, transparent panel, opening, or other structure is generically referred to as a "window" in the claims), for admitting an image of whatever is within the field of view of the video camera. A lens is the usual type of window 64. In this embodiment, the position of the lens can be varied, thus focusing the lens on objects at different distances, by rotating the lens plate 72. The lens plate 72 is provided with spanner sockets 74 and 76 for this purpose.

The video camera 18 has an internal, solid-state, charge-coupled device (CCD) (not illustrated), on which the image to be transmitted is focused by the lens 64. The charge-coupled device converts the image to an electrical signal which is transmitted on the conductor 50.

The light source 20–34 is supported on the support 14. The light source 20–34 illuminates at least part of the field of view, so an image of objects in the field of view can be generated in the video camera 18.

The light source 20–34 can be one or more electric-powered illuminating lamps 20. The preferred light source, shown best in FIG. 2, includes two or more illuminating lamps, here the lamps 20–34, distributed around the optical axis of the lens 64. (The optical axis of the lens 64 passes through the center of the lens 64 and is perpendicular to the lens plate 72.) Illumination provided by more than one lamp 20–34 reduces shadows, as the shadow cast by one lamp, such as 20, is illuminated by one or more of the others. If an elongated or ring-shaped lamp is used as the light source 20–34, shadow-free lighting might be obtainable from a single lamp.

One, two, three, four, five, six, seven, eight, or more lamps 20–34 are specifically contemplated here. A number of lamps can be connected in series to provide a light source having the same operating voltage as the video camera 18, so the lamps and video camera may be fed in parallel from the same source of electrical power.

A preferred light source 20–34 is one or more infrared LED's, which seem to work well in a monochrome video device. Incandescent, fluorescent, gas-discharge, or other types of light sources could also be used. Most of them are more easily damaged than LED's, however, particularly in the environment of an automobile engine.

One advantage of using an infrared light source is that it provides the necessary illumination without generating much, or any, visible light. This means that the apparatus does not create unwanted glare if it is directed back toward the mechanic in use. This represents an advantage compared to the use of conventional, separate lights. The absence of visible light may also be useful if the apparatus is used for night military applications, where it may be desirable to avoid creating a light and giving away the position of personnel or equipment which are targets.

Figure 3:
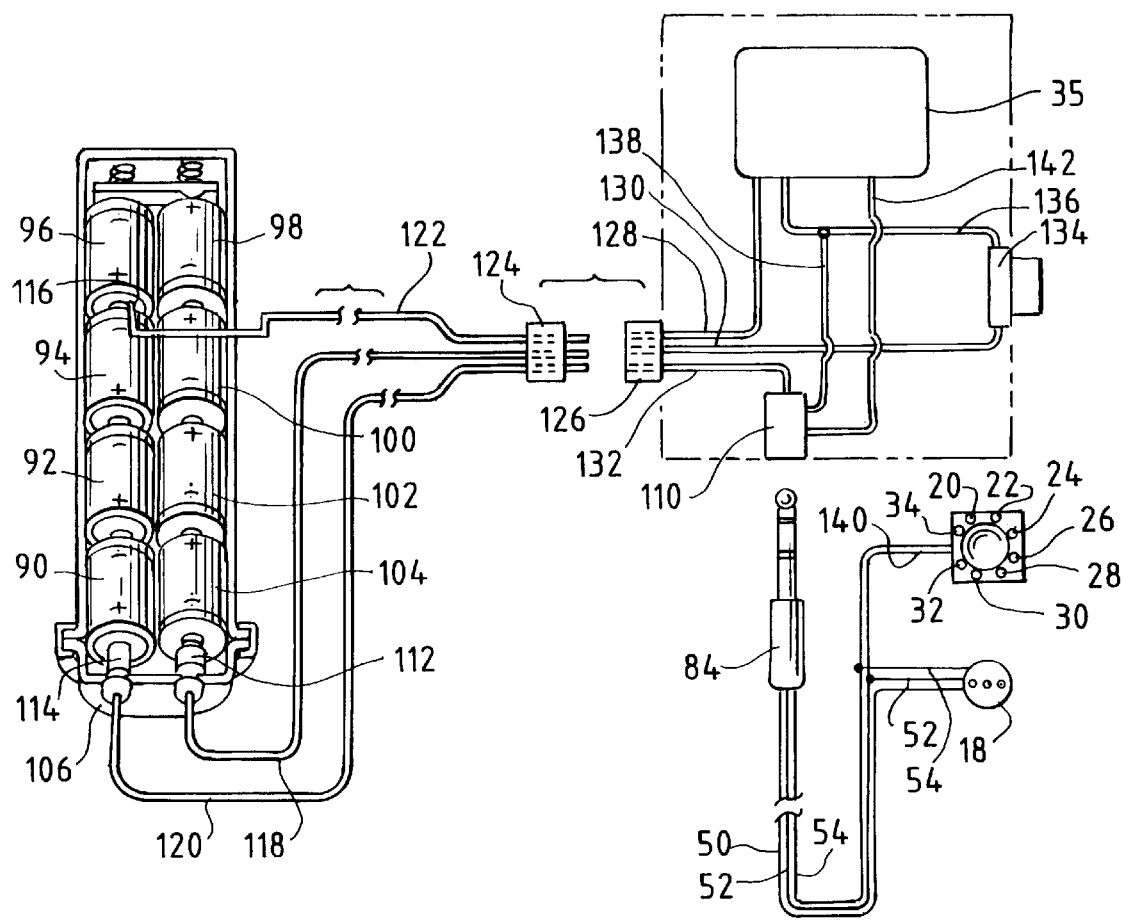
FIG. 3 is a schematic drawing of the electrical parts and connections of the apparatus.

Referring in particular to FIGS. 2 and 3, the present apparatus includes three electrical conductors connected to the light source or the video camera—a video lead 50, a common ground lead 52, and a power lead 54. The three conductors are protected by an outer jacket, defining an electrical cable 78. The electric cable 78 has a first end 80 extending from the support 14 for carrying a video signal from the video camera 18 and power to the video camera 18 and light source 20–34. The cable 78 has a second end 82 extending from the support end 40 of the shaft 12 for receiving electrical power and transmitting a video signal. In this embodiment, the second end 82 terminates at the connector 84 which is received in the monitor 35.

The jacket of the cable 78 can be made of silicone or other heat-resistant, flexible material. The advantages of silicone as the jacket of the cable 78 are that it is extremely flexible, so the support 14 can be flexed repeatedly on the shaft 12 and the shaft 12 itself can similarly be repeatedly flexed. The jacket is heat-resistant and is heat insulation, so it and the electrical insulation around each conductor 50–54 are protected from the heat of a hot internal combustion engine when the apparatus 10 is used there.

The electrical cable 78 includes a flexible strain relief portion 86 extending from the video camera 18 (and here from the support 14), bridging the pivot 16, and extending to the shaft 12. The flexible strain relief portion 86 should be flexible, so the pivot 16 can be worked repeatedly, and heatproof, as no other structure shields it in this embodiment. Other external shields and electrically conductive swivels could, however, readily be devised by a skilled person who is aware of this disclosure. The strain relief portion 86 desirably is substantially longer than the maximum span it must bridge, so the radius of bending of the portion 86 can be relatively large.

The cable 78 passes through the first port 46, into the hollow portion 55 of the shaft 12, and out the second port 48. The portion of the cable 78 extending from the support end 40 of the shaft includes a retractable coil 88, as shown in FIG. 1, along at least part of its length. The retractable coil 78 keeps the external portion of the cable 78 out of the fan of an internal combustion engine or other moving parts when the apparatus 10 is used.

The apparatus 10 is battery operated, although it could be operated on line current. Battery operation is preferred, even where shop electricity is readily available, so the invention can be used without plugging in a power cord and possibly routing an extension cord each time it is to be used. Referring to FIGS. 1 and 3, the batteries 90, 92, 94, 96, 98, 100, 102, and 104 are rechargeable, 1.2 volt nickel-cadmium cells integrated into a battery pack 106.

The battery pack 106 is removably attached to the video monitor 35 to define one assembly which is small enough and light enough in weight to readily be held in one hand such as 39 during use for at least several minutes. A securing strap 108 is provided for removably attaching the battery pack to the video monitor. The strap 108 can be secured with a buckle or cinch, tied, etc. The strap 108 is preferably secured with VELCRO fasteners or other hook and loop fabric fasteners. Straps equipped with hook and loop fabric fasteners are commercially available. The battery pack 106 and monitor 35 could also be permanently integrated into a single case or fastened by other fastening methods or apparatus.

In this embodiment, the power source represented by the battery pack 106 is a dual-voltage power source because the monitor 35 operates at a different voltage than the light source 20–34 and the video camera 18. Specifically, the monitor 35 operates at 6 volts, and the video camera 18 and light source are designed to be operable at 9.6 volts.

Referring to FIG. 3, the electrical circuits employed in the present invention are illustrated.

The battery pack 106 has its eight batteries 92–104 connected in series. The series of batteries 90–104 in the battery pack 106 has a negative end 112, a positive end 114, and an intermediate tap 116. A first or ground conductor 118 contacts the negative end of the series, a second conductor 120 contacts the positive end of the series (+9.6 volts), and a third conductor 122 taps the batteries between the negative and positive ends of the series (+6 volts). The conductors 118, 120, and 122 are led to a three-conductor connector 124 which mates with a complementary three-conductor connector 126. The leads to the connector 126 are a +6 volt conductor 128 which supplies power to the monitor 35, a negative ground (common) conductor 130, and a +9.6-volt conductor 132.

The conductor 130 goes to the input terminal of a single-pole, snap-action, latching, push button, on-off switch 134. The switch 134 replaces the original on-off switch on the monitor 35. The switch 134 has a relatively stiff spring. The apparatus can be rested on a bench with the button of the switch 134 against the bench surface, which a mechanic might do while using the apparatus 10, without operating the switch 134 unintentionally. The output terminal of the switch 134 is connected by conductors 136 and 138 to the monitor 35 and the center terminal of the connector 110.

The connectors 110 and 84 can be a three-conductor "RCA" ¼ inch phono jack and plug, such as those commonly used to temporarily connect a pair of audio headphones to a stereo audio receiver. These connectors form a strong, simple, reliable connection which can be repeatedly made and broken without damage.

When the connectors 84 and 110 are joined, electricity is carried from the center terminal of the connector 110 to the center terminal of the connector 84, and from there to the conductor 52 feeding the video camera 18 and the conductor 140 feeding the light source 20–34. The +9.6-volt conductor 132 is connected to the top terminal of the connector 110. When the connectors 84 and 110 are joined, electricity is carried from the top terminal of the connector 110 to the top terminal of the connector 84, and from there to the conductor 54 which is the positive power lead feeding the video camera 18 and the light source 20–34. The video signal is carried from the video camera 18, via the conductor 50, the bottom terminals of the connectors 84 and 110, and the conductor 142 to the monitor 35.

The monitor 35 can be a commercially available monochrome video monitor. The monitor shown here, however, has been modified by mounting the connectors 110 and 126 in the case 144 for the monitor 35. This change simplifies the apparatus 10 by integrating the power supplies for the monitor 35, the video camera 18, and the light source 20–34 with each other and with the video conductors 50 and 142.

Figure 4:
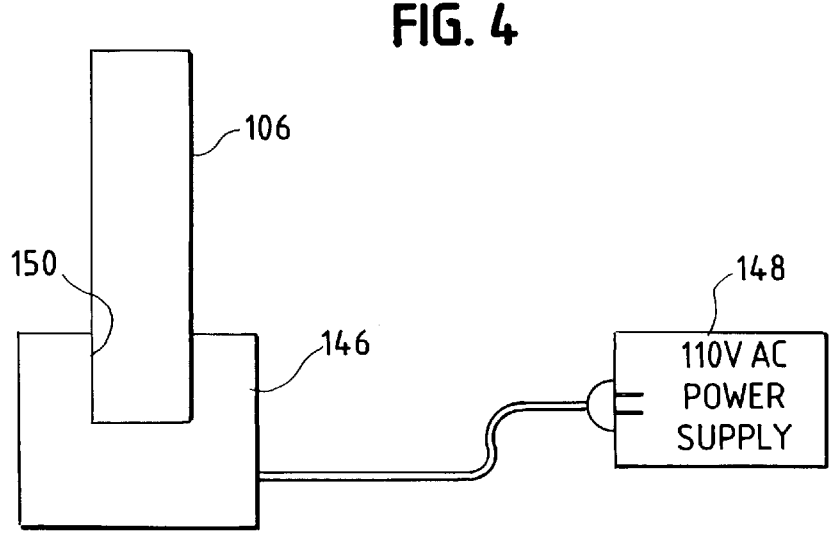
FIG. 4 is a schematic drawing of the rechargeable battery power source of the present invention, installed temporarily in a charging module to recharge its batteries.

FIG. 4 shows the battery pack 106 plugged into a conventional battery charger 146, which in turn can be plugged into a 110 volt AC power supply 148, such as conventional home or shop electricity. This is accomplished by joining the conductors 118 and 120 to the battery pack 106 using a connection which does not interfere with the fit of the battery pack 106 into the charger opening 150.

The apparatus 10 described and illustrated above has several advantages. It can be operated for an extended period next to hot moving parts under the hood near a running automobile engine. The apparatus does not need to be particularly expensive, as it can be made from readily available, low-cost parts. Even miniature CCD video cameras of the size employed here can now be purchased at modest cost.

The illustrated apparatus avoids most of the disadvantages of a mechanic's mirror, particularly because it has its own shadow-free light source, the image can be magnified, the device itself does not block the view it provides, and several people can view the same image on the monitor at one time.

The apparatus 10 can be operated with one hand, so the other hand is free to perform an adjustment, hold an interfering part out of the way, or the like.

The shaft or the pivots can be bent and straightened or otherwise adjusted repeatedly.

The three major parts of the apparatus can run from a single battery power supply, even though the parts conventionally run at different voltage levels. The apparatus can have a minimum of wiring and other connections between a remote sending apparatus, a display apparatus, and an associated power supply. The sending part can readily be disconnected from the receiving and viewing part, so either can be replaced or repaired individually.

The other previously-discussed advantages of this invention are also realized, at least to some degree.

We claim:

1. Simple, rugged apparatus useful for inspection of a remote or obstructed field of view, comprising:
   A. a hand-held shaft having one end and an opposite end;
   B. a support;
   C. a pivot securing said support to the opposite end of said shaft;
   D. a miniature video camera mounted on said support, having a window for admitting an image and having a field of view;
   E. a light source comprising at least one electric-powered illuminating lamp disposed on said support and illuminating at least part of the field of view;
   F. a video monitor operatively connected for receiving a video signal from said video camera and displaying a video image of objects in the field of view; and
   G. a power source operatively connected for supplying electrical power to said video camera and said video monitor;

wherein at least one of said video camera, said light source, and said video monitor is a higher voltage device and at least one other of them is a lower voltage device, and said power source is a dual-voltage power source comprising plurality of batteries connected in series and connected to a first conductor at the positive end of said series, a second conductor at the negative end of said series, and a third conductor tapping said batteries between the negative and positive ends of said series, wherein said first and second conductors supply power to said at least one higher voltage device and said third conductor and one of said first and second conductors supply power to said at least one lower voltage device.

2. The apparatus of claim 1, wherein said batteries are rechargeable batteries integrated into a battery pack.

3. The apparatus of claim 2, wherein said battery pack is removably attached to said video monitor to define one assembly which is small enough and light enough in weight to readily be held in one hand during use for several minutes.

4. The apparatus of claim 3, further comprising a securing strap for removably attaching said battery pack to said video monitor.

* * * * *